J. BUCKLEY.
Milk and Oyster Can.
No. 68,696.
Patented Sept. 10, 1867.
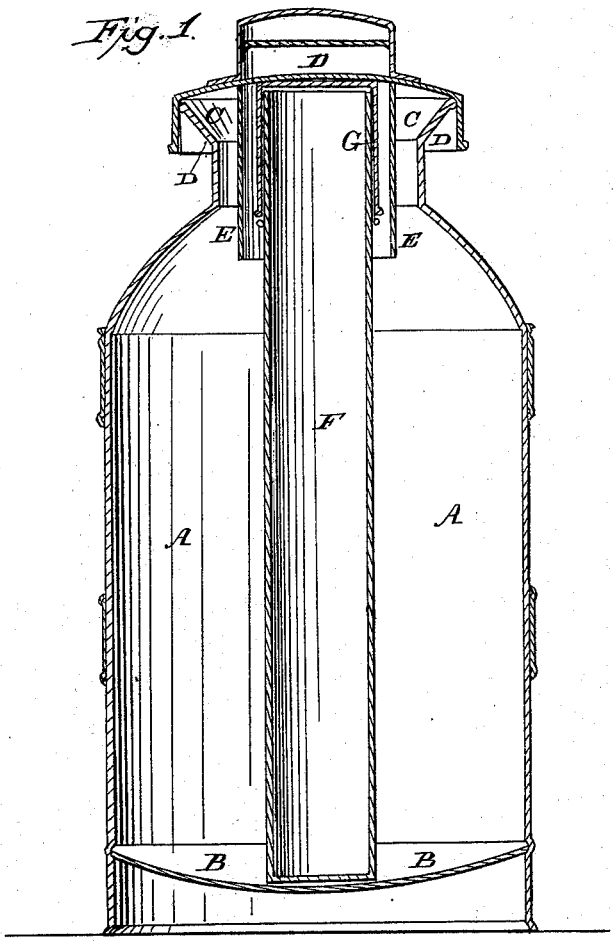
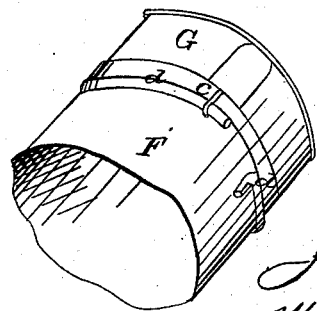
Witnesses:
John O. Wiedersheim
Charlie D Davis
Inventor:
John Buckley
By.
Wiedersheim & Co.
Attorneys.

United States Patent Office.

JOHN BUCKLEY, OF BALTIMORE, MARYLAND, ASSIGNOR TO THOMAS J. LOGAN, OF WASHINGTON, DISTRICT OF COLUMBIA.

*Letters Patent No. 68,696, dated September 10, 1867.*

IMPROVED MILK AND OYSTER-CAN.

*The Schedule referred to in these Letters Patent and making part of the same.*

TO ALL WHOM IT MAY CONCERN:

Be it known that I, JOHN BUCKLEY, of Baltimore, in the State of Maryland, have invented a new and useful Improvement in Cans for Milk, Oysters, &c.; and I do hereby declare the following to be a full and correct description of the same, sufficient to enable others skilled in the art to which my invention appertains to understand and use the same, reference being had to the accompanying drawings, making part of this specification, and in which—

Figure 1 is a vertical central section of my improved can.

Figure 2 is a perspective view of part of the tops of the ice-tube.

Similar letters of reference indicate corresponding parts in the two figures.

The nature of my invention consists in a novel and simple manner of holding an inner ice-tube in a can for milk, oysters, &c., to keep them from spoiling while being transported on the railroad or carried through the streets.

A, in my drawings, represents a can to hold milk, oysters, &c., provided with a concave bottom, B. Over its mouth, C, the cover D fits tightly, which is provided with an inner rim, E, extending downward into the can A, and surrounding the upper part of the inner ice-tube F. This tube F is provided with a cover, G, fastened by means of the hook $c$ on the cover sliding over the wire $d$ on the tube. Thus, by slipping the cover on the tube, so that the hook $c$ will pass between the two ends of the wire $d$, the hook $c$ will, by slightly turning the cover, grasp the wire $d$, and hold the cover G firmly on the tube F.

A great loss results to farmers who send milk from the country to cities by the frequent delay of railroad trains having the milk on board, the same getting sour or unfit for use before it reaches the consumer, and thus resulting in a dead loss to the farmer. The same inconvenience is often felt by dealers in sending oysters and other perishable articles from the city to the country. My improved can is intended to obviate these losses, and to furnish means of safely transporting the articles without danger of spoiling them.

I am well aware that it is not new to place an ice-tube into a can; but all devices heretofore used to hold the tube in place have been so constructed as to interfere with the pouring out of the milk or taking out of the oysters, and to make a thorough cleaning of the can almost an impossibility. The tube in my improved can is held in place by means of the pressure of the cover D on the cover G of the tube F, the bottom of which rests firmly against the centre of the concave bottom B of can A, the rim E on the cover D preventing any lateral movement of the tube F, which is filled with finely shaved ice pressed into it until there is a solid column of ice. The cover G being tightly placed on the tube F will keep the same air-tight, and thus prevent the melting of the ice for a long time. As the bottom B of the can A is concave, the bottom of the tube F will always seek the centre of the bottom B, and being held by the pressure from above, and by the rim E, it is as immovable as if it were soldered on to the bottom. On taking the cover D off, the tube F can be taken out, and the contents of the can emptied without the necessity of using springs, &c., and both can and tube may be easily and thoroughly cleaned.

Having thus described my invention, what I claim as new, and desire to secure by Letters Patent, is—

The tube F, resting on the concave bottom B of the can A, and extending to the top of the can, being held in position by means of the pressure of the cover D, and prevented from moving laterally by means of the downward extending rim E on the cover D, substantially as described.

To the above I have signed my name this 19th day of March, 1867.

JOHN BUCKLEY.

Witnesses:
J. McKENNEY,
JOHN A. WIEDERSHEIM.